UNITED STATES PATENT OFFICE.

CARL LUDWIG MÜLLER AND ERNST SCHMID, OF LUDWIGSHAFEN-ON-THE-RHINE, GERMANY, ASSIGNORS TO BADISCHE ANILIN UND SODA FABRIK, OF LUDWIGSHAFEN-ON-THE-RHINE, GERMANY, A CORPORATION OF GERMANY.

ACRIDIN DYE.

SPECIFICATION forming part of Letters Patent No. 716,264, dated December 16, 1902.

Application filed September 17, 1902. Serial No. 123,761. (No specimens.)

*To all whom it may concern:*

Be it known that we, CARL LUDWIG MÜLLER, doctor of philosophy, a subject of the King of Bavaria, and ERNST SCHMID, doctor of philosophy, a citizen of the Swiss Republic, both residing at Ludwigshafen-on-the-Rhine, in the Kingdom of Bavaria, Germany, have invented new and useful Improvements in Coloring-Matters of the Acridin Series, of which the following is a specification.

We have discovered that the phthalylamids described by Biedermann (*Berichte* 10, page 1160) and obtained by heating phthalic anhydrid with diamins—for example, with meta-phenylene-diamin and meta-toluylene-diamin—on being further condensed with such diamins under suitable conditions yield valuable yellow to red-yellow coloring-matters of the acridin series. We also find that instead of using a phthalyl-amid as initial material we can proceed directly from phthalic anhydrid and an aforesaid diamin, which bodies when suitably condensed together yield the same or similar yellow coloring-matters, as aforementioned. The condensation should be effected at a sufficiently high temperature—say from about one hundred and seventy to about two hundred and twenty degrees centigrade (170°-220° C.)—and in the presence of a suitable condensing agent. As suitable condensing agents we mention hydrochloric acid, (in the form of the hydrochlorid of a diamin,) zinc chlorid, phosphoric anhydrid, and the like. Either monophthalyl-diamin, or diphthalyl-diamin, or a mixture of these bodies can be used as initial material for the purposes of this invention, or, as aforesaid, the preparation of the phthalyl-diamins and their conversion into yellow coloring-matter can be conveniently effected in one operation.

Good results have been obtained by employing one molecular proportion (1) of phthalic anhydrid to from two and a half to three (2½-3) molecular proportions of diamin, both when starting from phthalyl-diamins and when starting from phthalic anhydrid and a diamin.

Our new coloring-matter dissolves in ethyl alcohol or water, yielding an orange-yellow solution with a green fluorescence. The addition of sodium nitrite and hydrochloric acid to the aqueous solution of the coloring-matter causes the formation of a brown-violet solution containing a diazo compound. On being boiled in a reflux apparatus for from two to three (2-3) hours with about five (5) times its weight of hydrochloric acid (containing about thirty-two (32) per cent. of HCl) it is partially decomposed into a meta-diamin and a diamido-phenyl-acridin-carboxylic acid. Thus the coloring-matter obtainable from meta-phenylene-diamin and phthalic anhydrid yields meta-phenylene-diamin and di-amido-phenyl-acridin-carboxylic acid, (see Meyer and Oppelt, *Ber.* 21, page 3377,) while the coloring-matter from meta-toluylene-diamin and phthalic anhydrid yields meta-toluylene-diamin and a body which has the empirical composition required by diamido-dimethyl-phenyl-acridin-carboxylic acid. These decomposition products may be recognized as follows: To the solution obtained on boiling with acid, as aforesaid, add about five (5) times its volume of an aqueous solution of crystallized sodium acetate, (containing about forty (40) per cent. of the salt.) The diamido-alphyl-acridin-carboxylic acid formed (together with unaltered coloring-matter) is precipitated. Filter off this precipitate. The filtrate contains the meta-diamin, which can be isolated and recognized in the known manner. Extract the precipitate obtained as above with hot dilute caustic-soda lye. Diamido-phenyl-acridin-carboxylic acid or a homologue thereof dissolves, yielding a pale yellow alkaline solution, which on being acidified by means of hydrochloric acid becomes deep orange yellow.

The new coloring-matter dyes cotton mordanted with tannin and tartar emetic yellow to yellow-red shades.

The following examples will serve to further illustrate the nature of our invention; but it is not confined to these examples nor to the conditions described therein. The parts are by weight.

*Example 1—Coloring-matter obtained from*

*mono-phthalyl-meta-toluylene-diamin and meta-toluylene-diamin.*—Heat in an enameled iron vessel at a temperature of about two hundred to two hundred and ten degrees centigrade (200°–210° C.) twenty-five (25) parts of mono-phthalyl-toluylene-diamin, melting-point one hundred and ninety-two degrees centigrade, (192° C.,) eighteen (18) parts of meta-toluylene-diamin base, ten (10) parts of meta-toluylene-diamin-hydrochlorid, and fourteen (14) parts of zinc chlorid. Continue the heating for from about four to six (4–6) hours and stir during the operation. When cold, powder the melt, extract it at a temperature of from fifty to sixty degrees centigrade (50°–60° C.) with about four hundred (400) parts of dilute hydrochloric acid, (containing about one (1) per cent. of HCl.) Boil the residue with one thousand (1,000) parts of water and thirty (30) parts of hydrochloric acid, (containing about thirty-two (32) per cent. of HCl,) so as to bring the coloring-matter into solution. Then cool this solution to a temperature of about thirty degrees centigrade (30°) and filter at this temperature. Precipitate the coloring-matter from the filtrate by means of common salt, melt the precipitate by warming it, remove the mother-liquor therefrom, and dry it on the water-bath.

*Example 2—Coloring-matter obtained from phthalic anhydrid and meta-toluylene-diamin.*—Melt thirty (30) parts of phthalic anhydrid, forty-eight (48) parts of meta-toluylene-diamin base, and forty-seven (47) parts of meta-toluylene-diamin-hydrochlorid, as explained in the foregoing Example 1. At a temperature of about one hundred and forty-five degrees centigrade (145° C.) an energetic reaction, accompanied by frothing and the formation of steam, takes place. Raise the temperature of the melt to from two hundred to two hundred and ten degrees centigrade, (200°–210° C.,) at which temperature the formation of coloring-matter takes place and is finished after from about four to five (4–5) hours heating. Powder this melt when cold, boil it with two thousand (2,000) parts of water and sixty (60) parts of hydrochloric acid, (containing about thirty-two (32) per cent. of HCl,) and when all that is soluble is dissolved filter and precipitate the coloring-matter from the filtrate by means of common salt and proceed further, as described in Example 1.

By replacing the meta-toluylene-diamin or its phthalyl compound in the foregoing examples by meta-phenylene-diamin or its phthalyl compound coloring-matters of similar properties, but dyeing a redder shade, are formed, or the meta-toluylene-diamin-phthalyl compound can also be melted with meta-phenylene-diamin, or vice versa, and the phthalic anhydrid can be melted with mixtures of meta-toluylene-diamin and meta-phenylene-diamin.

We claim—

1. The new coloring-matter of the acridin series obtainable by melting a meta-diamin with phthalic anhydrid in presence of a condensing agent, which dyes cotton mordanted with tannin and tartar emetic, yellow to yellow-red shades, and which on being boiled with concentrated hydrochloric acid is decomposed into a meta-diamin and a diamido-phenyl-acridin-carboxylic acid, whose alcoholic or aqueous solution is yellow with a green fluorescence, which aqueous solution on the addition of sodium nitrite and hydrochloric acid becomes brown-violet.

2. The new coloring-matter of the acridin series obtainable by melting meta-toluylene-diamin with phthalic anhydrid and a condensing agent, which dyes cotton yellow shades, and which on being boiled with concentrated hydrochloric acid is decomposed into meta-toluylene-diamin and diamido-dimethyl-phenyl-acridin-carboxylic acid, whose alcoholic or aqueous solution is yellow with a green fluorescence, which aqueous solution on the addition of sodium nitrite and hydrochloric acid becomes brown-violet.

In testimony whereof we have hereunto set our hands in the presence of two subscribing witnesses.

CARL LUDWIG MÜLLER.
ERNST SCHMID.

Witnesses:
JOHN L. HEINKE,
JACOB ADRIAN.